United States Patent
Achan et al.

(10) Patent No.: US 8,856,360 B2
(45) Date of Patent: Oct. 7, 2014

(54) AUTOMATICALLY IDENTIFYING DYNAMIC INTERNET PROTOCOL ADDRESSES

(75) Inventors: Kannan Achan, Mountain View, CA (US); Eliot Gillum, Mountain View, CA (US); Yinglian Xie, Cupertino, CA (US); Fang Yu, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/821,211

(22) Filed: Jun. 22, 2007

(65) Prior Publication Data

US 2008/0320119 A1 Dec. 25, 2008

(51) Int. Cl.
*G06F 15/16* (2006.01)
*H04L 29/06* (2006.01)
*H04L 29/12* (2006.01)

(52) U.S. Cl.
CPC ............ *H04L 63/1408* (2013.01); *H04L 61/35* (2013.01); *H04L 29/12783* (2013.01)
USPC .......................... 709/228; 709/227; 709/229

(58) Field of Classification Search
USPC ......................................................... 709/228
See application file for complete search history.

(56) References Cited

U.S. PATENT DOCUMENTS

| | | | |
|---|---|---|---|
| 5,724,510 A | 3/1998 | Arndt et al. | |
| 5,818,964 A * | 10/1998 | Itoh ............................... | 382/205 |
| 6,212,563 B1 * | 4/2001 | Beser ............................ | 709/227 |
| 6,327,621 B1 * | 12/2001 | Lee et al. ....................... | 709/227 |
| 6,434,600 B2 | 8/2002 | Waite et al. | |
| 6,862,286 B1 * | 3/2005 | Tams et al. .................... | 370/401 |
| 6,952,735 B1 * | 10/2005 | Aune ............................. | 709/228 |
| 7,272,853 B2 * | 9/2007 | Goodman et al. ............... | 726/13 |
| 7,761,558 B1 * | 7/2010 | Jindal et al. .................... | 709/224 |
| 2002/0133578 A1 | 9/2002 | Wu | |
| 2003/0069933 A1 | 4/2003 | Lim et al. | |
| 2005/0022031 A1 | 1/2005 | Goodman et al. | |
| 2005/0089048 A1 * | 4/2005 | Chittenden et al. ...... | 370/395.54 |
| 2006/0026246 A1 * | 2/2006 | Fukuhara et al. ............. | 709/206 |
| 2006/0028996 A1 * | 2/2006 | Huegen et al. ................ | 370/252 |
| 2006/0133354 A1 | 6/2006 | Lee | |
| 2006/0168041 A1 * | 7/2006 | Mishra et al. ................. | 709/206 |
| 2006/0195610 A1 * | 8/2006 | Cole et al. ..................... | 709/245 |
| 2006/0248229 A1 | 11/2006 | Saunderson et al. | |
| 2007/0250608 A1 * | 10/2007 | Watt .............................. | 709/222 |
| 2007/0250644 A1 * | 10/2007 | Lund et al. .................... | 709/245 |
| 2008/0082658 A1 * | 4/2008 | Hsu et al. ...................... | 709/224 |

FOREIGN PATENT DOCUMENTS

| | | |
|---|---|---|
| EP | 1355448 A2 | 6/2007 |
| WO | 2006088947 A2 | 8/2006 |

OTHER PUBLICATIONS

"IPsynchro (zip)", http://software.techrepublic.com.com/download.aspx?docid=216065.
Durst, et al., "Testing and Evaluating Computer Intrusion Detection Systems", Date: Jul. 1999, vol. 42, Issue: 7, pp. 53-61, ACM Press, New York, USA.
B. Krishnamurthy and J. Wang. On Network-Aware Clustering of Web Clients. In Proc. of Sigcomm, 2000.

(Continued)

*Primary Examiner* — Umar Cheema
(74) *Attorney, Agent, or Firm* — Micah Goldsmith; Glen Johnson; Micky Minhas

(57) ABSTRACT

Dynamic IP addresses may be automatically identified and their dynamics patterns may be analyzed. Multi-user IP address blocks are determined as candidates for further analysis. An entropy score is determined for each IP address in every candidate block to distinguish between a dynamic IP and a static IP shared by multiple users. IP addresses with high entropy scores are grouped, and then analyzed, and may be used in various applications, such as spam filtering.

20 Claims, 8 Drawing Sheets

(56) References Cited

OTHER PUBLICATIONS

F. Li and M.-H. Hsieh. An Empirical Study of Clustering Behavior of Spammers and Group-based Anti-Spam Strategies. In Conference on Email and Anti-Spam, 2006.

A. Ramachandran, D. Dagon, and N. Feamster. Can DNSBased Blacklists Keep Up with Bots? In Conference on Email and Anti-Spam, 2006.

\* cited by examiner

AUTOMATICALLY IDENTIFYING DYNAMIC INTERNET PROTOCOL ADDRESSES

BACKGROUND

An Internet protocol (IP) address is a unique address that certain electronic devices use in order to identify and communicate with each other on a computer network utilizing the IP standard. A static IP address is an unchanging IP address that a computer uses every time it connects to a network such as the Internet. With a static IP address, a computer's identity can be easily identified by others; that way, for example, a website, email server, or other type of server connection can be hosted.

A dynamic IP address, on the other hand, is an IP address that is assigned to a computer, usually by a remote server that acts as a dynamic host configuration protocol (DHCP) server. IP addresses assigned using DHCP may change depending on the addresses available in the server set scope.

Currently existing dynamic IP address information has been manually collected and maintained. For example, a conventional dynamic IP list contains a list of dialup IP addresses, and may contain other dynamic IP addresses such as digital subscriber line (DSL) and cable user IP address ranges. Manually maintaining such a large list requires enormous effort and resources. Moreover, updating the list of dynamic IP addresses relies on the reporting of system administrators. With Internet topology and IP address assignments changing rapidly, such lists can be expected to contain increasingly obsolete information and omit newly configured dynamic IP addresses.

A reverse domain name system (rDNS) database is another conventional collection of IP address information. Reverse DNS is a process that looks up the host name associated with a given IP address. An rDNS record translates an IP address into a host name, which may be used to infer the address properties. Despite the existence of DNS naming conventions and recent proposals on standardizing DNS name assignment schemes, not all domains follow the naming rules. In fact, it is estimated that nearly half of all IP addresses do not have rDNS records.

SUMMARY

Dynamic Internet protocol (IP) addresses may be automatically identified and their dynamics patterns may be analyzed. Multi-user IP address blocks are selected from an input dataset as candidates for further analysis. An entropy score is determined for each IP address in every candidate block, and is used to determine a level of dynamic usage. The aggregated level of dynamic usage of a candidate block may be used to distinguish between a dynamic IP address block and a static IP address block where multiple users may share an IP address. IP addresses with high entropy scores are grouped using signal smoothing techniques and then analyzed. IP addresses that might be associated with large-scale proxy clusters may be filtered. An output may include a list of adjusted IP address blocks and their associated dynamics.

The outputted information may be used in spam detection and filtering, blacklisting, and other security techniques. A host may block the dynamic IP addresses as it is widely observed that dynamic IP addresses are used by zombie spammers to send out purely spam emails.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION

Manually collecting and maintaining a list of dynamic IP addresses requires substantial effort and resources, especially as the Internet continues to rapidly evolve. Dynamic IP addresses may be automatically identified and their dynamics patterns may be analyzed. Dynamic IP addresses correlate well with disruptive network behavior such as email spamming. In an implementation, the dynamic IP addresses referred to herein are DHCP addresses, excluding statically configured addresses such as those based on host-MAC (media access control) address mapping or sufficiently long effective lease times so as to be essentially static. As used herein, "dynamic" refers to dynamic address assignment in usage, as opposed to dynamic host configuration protocol.

Dynamic IP addresses tend to manifest in blocks because it is common for system administrators to assign a range of IP addresses as a pool rather than creating a discrete list of individual IP addresses. Therefore, aggregated IP address usage patterns at the address block level may be identified and used to generate a list of dynamic IP address blocks that are actively in use. A usage-based dynamic IP address map may then be generated. The term "block" is used to represent a group of continuous IP addresses, and it is a more fine-grained unit than an IP address prefix.

Several observations are noted that may be used in identifying dynamic IP addresses. Although a user can use multiple hosts, these hosts are usually not located together in the same network, or configured to use the same network access method (e.g., a laptop using a wireless network and an office desktop connecting through the Ethernet). Therefore, it is unlikely for a user to be associated with several to tens of static IP addresses, all from a very specific IP block. It is even more unlikely to observe a large number of users, with each having used multiple static IP addresses.

However, a large number of users in which each has used multiple IP addresses is highly characteristic of a dynamic IP address block. Dynamic IP addresses are usually allocated from a continuous address range, reachable by the same routing table prefix entries. Meanwhile, users using a dynamic IP address are likely to use other IP addresses from this range as well, due to the nature of dynamic address assignment. A history of aggregated user-IP address switching may be used to identify dynamic IP addresses.

Figure 1:
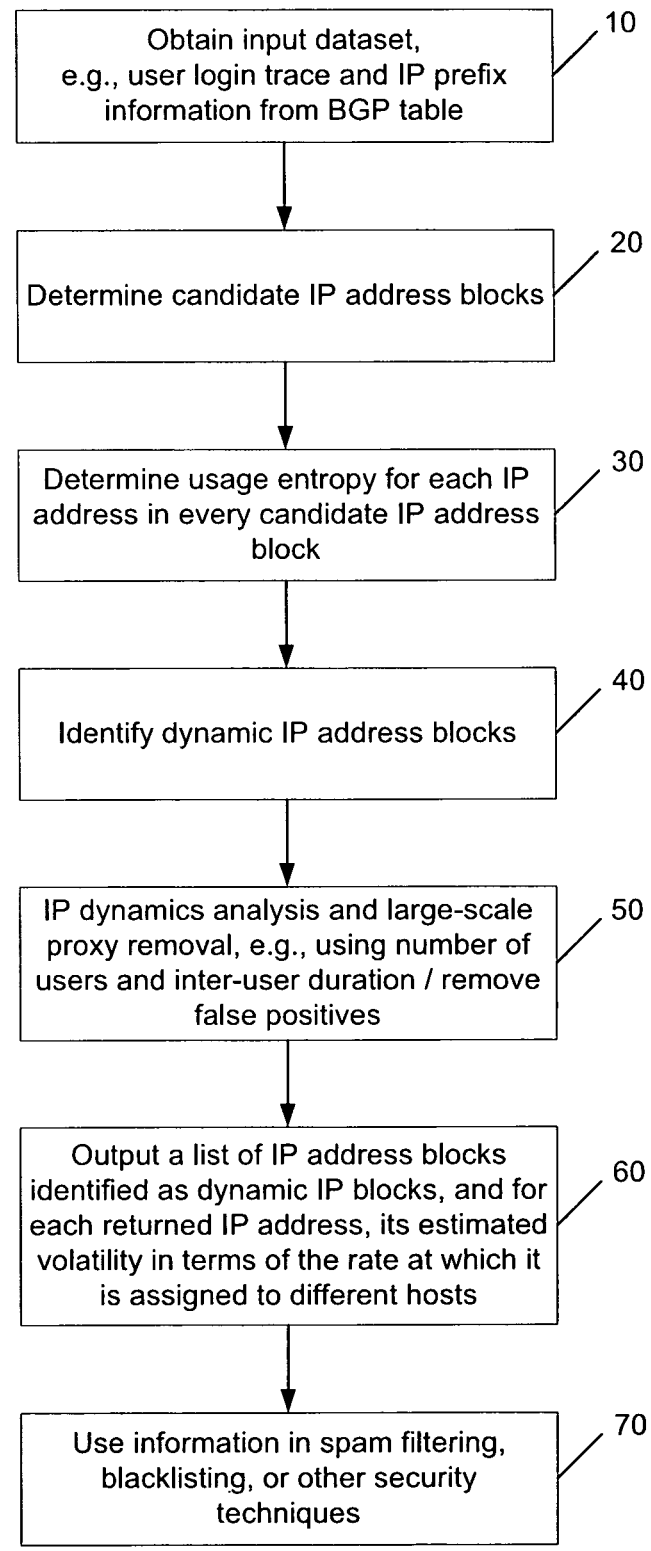
FIG. 1 is a flow diagram of an example method of dynamic IP address block identification and analysis.
Figure 2:
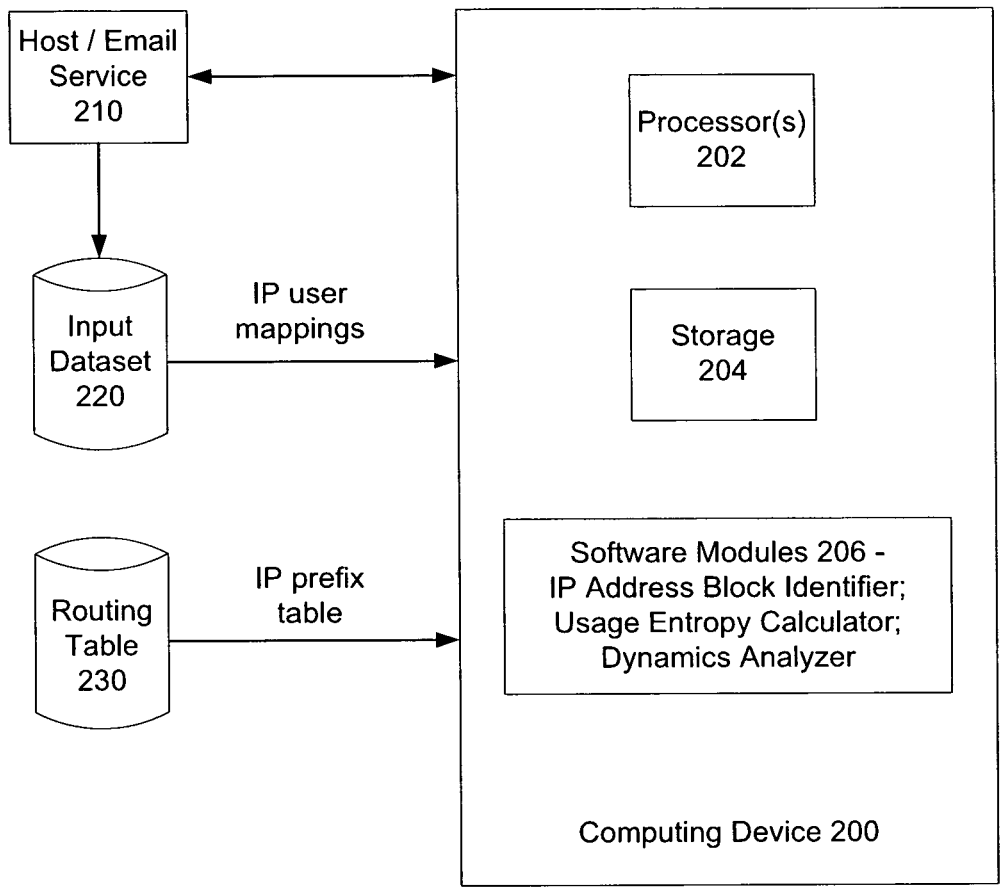
FIG. 2 is a block diagram of an example identification and analysis system.

FIG. 1 is a flow diagram of an example method of dynamic IP address block identification and analysis, and FIG. 2 is a block diagram of an example identification and analysis system. As shown, the example system includes a computing device 200 that has one or more processors 202, storage 204 (e.g., storage devices, memory, etc.), and software modules 206. The computing device 200, including its processor(s) 202, storage 204, and software modules 206, may be used in the performance of the example methods described herein. Example software modules include modules for identifying IP address blocks, calculating usage entropy, and analyzing dynamics, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 11.

An input dataset 220, such as a user login trace and IP prefix information, is obtained at step 10 and provided to the computing device 200, in an implementation. A user login trace may be obtained from a host or email service 210, and be based on a period of time. Although the host or email service 210 is shown separate from the computing device 200, it is contemplated that the host or email service 210 may be in communication with, or otherwise associated with, the computing device 200. In fact, the host or email service 210 may comprise the computing device 200.

Figure 3:
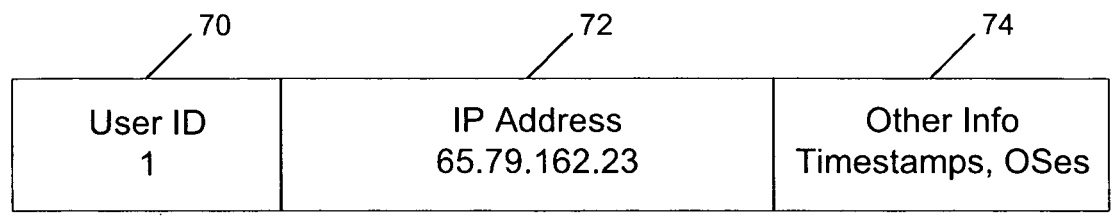
FIG. 3 shows an example entry in a user login trace.

An entry in a user login trace for an email service in an implementation is shown in FIG. 3. Each entry in a user login trace may contain an anonymized user identifier (ID) 70, the IP address 72 that was used to access the email service, and other aggregated information 74 about the login events corresponding to the user-IP address pair. The aggregated information may include the timestamps of the login events over the period of time, and the minimum and the maximum IDs of the operating systems used (the trace collection process encodes each distinct type and version of operating system into a unique operating system ID).

The examples, techniques, and systems described herein are by no means restricted to user login traces only, and can be applied to any dataset that contains IP addresses and some form of persistent data that can aid the tracking of host identities, e.g., user IDs, cookies, etc. Such datasets are readily available in many application logs including, but not limited to, search engine and web server traces. The availability of more accurate host identity information (e.g., operating system IDs, device fingerprints, packet TTLs (time to live), or MAC addresses) is not required, but may enhance the identification accuracy.

Thus, a historical usage log of a network service that contains not only IP addresses of service requests, but also user login IDs, may be used as input. The mapping between IP addresses and users, and vice versa, may be examined, and scanned for specific usage patterns. In an implementation, the routing state, such as IP address aggregation information, is also provided, via a routing table 230 and described further below. Therefore, the network proximity of the IP addresses used to source these requests may be determined.

In an implementation, at step 20, multi-user IP address blocks are determined by the computing device 200, as candidates for further analysis to determine whether they are dynamic. If more than one user is observed to use the same IP address, it is likely that the IP address has been assigned to more than one host and therefore is a candidate dynamic IP address. However, merely counting the number of users for each individual IP address is not desirable because it is likely that not all the IP addresses in a block will appear in the input dataset, and a small number of individual IP addresses in a dynamic IP block may still appear static by having a single user (e.g., a dynamic IP address assigned to a home router that rarely reboots).

In an implementation, the IP addresses that are determined to be contained within a dynamic IP address block form a range of addresses. The range of addresses are contiguous and do not cross network boundaries. Network boundary detection is well known and it is contemplated that conventional techniques may be used to determine network boundaries.

Figure 5:
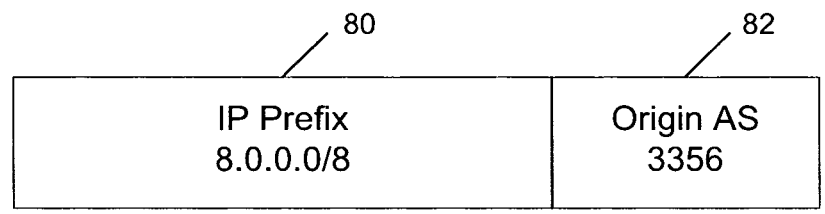
FIG. 5 shows an example entry in a routing table.
Figure 4:
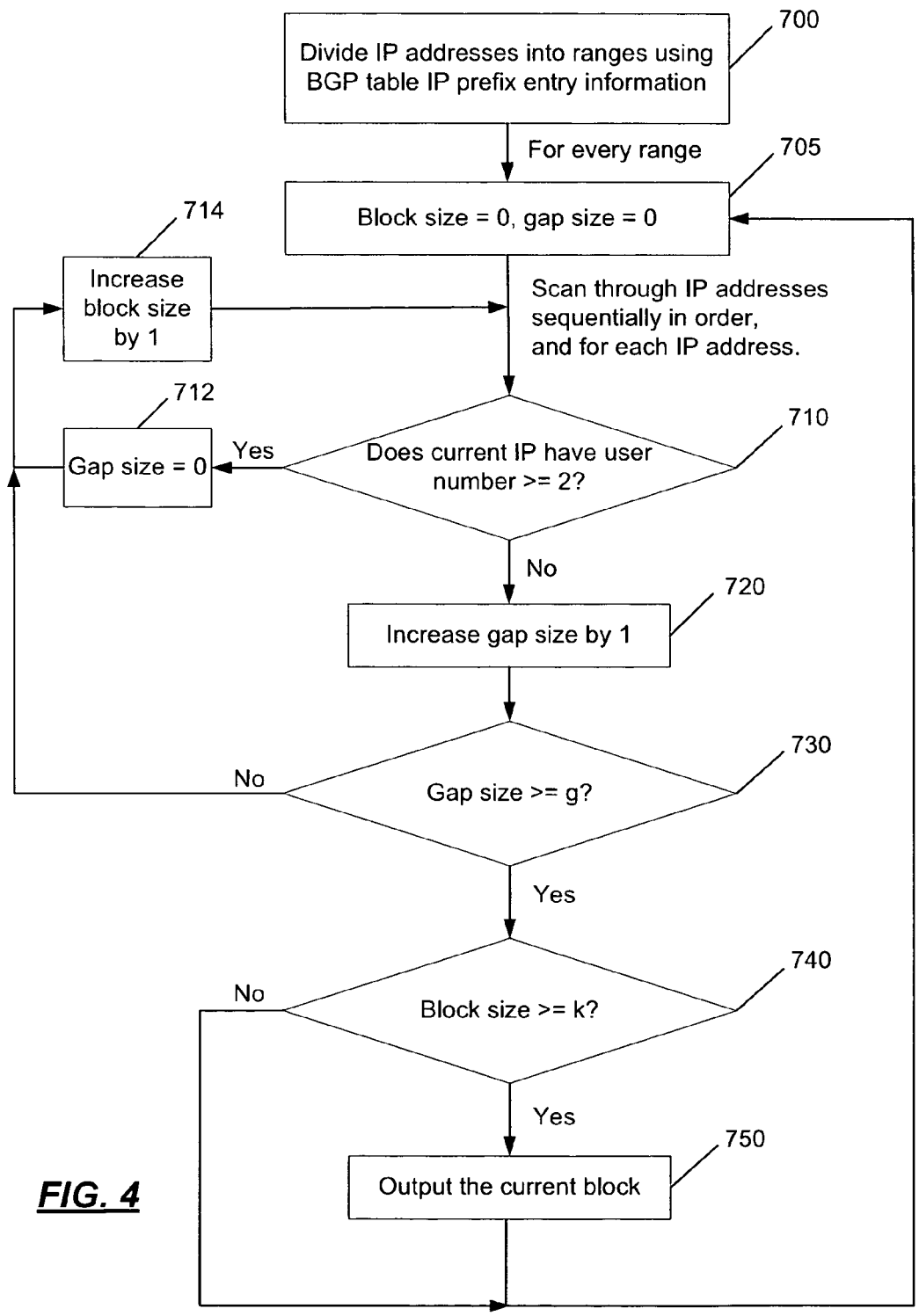
FIG. 4 is a flow diagram of an example method of candidate IP address block determination and selection.

Therefore, in an implementation, multi-user IP address blocks, rather than mere multi-user IP addresses, are used. A set of m continuous IP addresses $IP_1$ to $IP_m$ is selected as a candidate block $B(IP_1, IP_m)$ if, as shown in the flow diagram of FIG. 4, the continuous multi-user IP addresses in the block belong to the same autonomous system, and have the same routing prefix entry. An example routing table 230 that may be used is a border gateway protocol (BGP) routing table. An autonomous system is, in an implementation, a collection of routers under a single administrative authority, and BGP is a standard routing protocol, used primarily for routing between large, heterogenous networks. An entry in a routing table in an implementation is shown in FIG. 5, and comprises an IP prefix 80 and its corresponding origin autonomous system 82.

In an implementation, step 700 ensures that IP addresses within the same block are under a single domain and topologically close within a same network boundary. At step 700, IP addresses are divided into ranges using BGP table IP prefix entry information. For each range, both the block size and the gap size are set to 0, at step 705. The IP addresses are then scanned sequentially in order. It is determined at step 710 whether the current IP address has a user number of two or greater. If so, then the gap is set to 0 at step 712, and the block size is increased by one at step 714. A gap is defined as a region in the address space with g or more continuous IP addresses that are either not observed in the data or are used by at most a single user, where g is a predetermined number. If the current IP address is determined at step 710 to not have a user number of two or greater, then the gap size is increased by one at step 720.

The block does not have significant gaps, as determined at step 730, in an implementation. By limiting g, it is ensured that a significant portion of the multi-user IP addresses within the block are observed. If the gap size is less than g, then the block size is increased by one at step 714, and processing continues.

Figure 6:
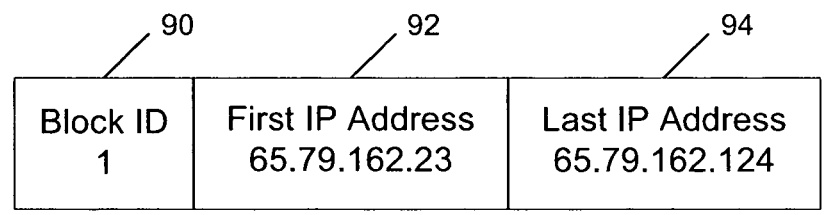
FIG. 6 shows an example entry in a candidate IP address block table.

Additionally, in an implementation, each IP address block that is determined as a candidate for further analysis has a minimum block size, e.g., by having at least k IP addresses, i.e., m≥k, as determined at step 740. FIG. 6 shows an example entry in a candidate IP address block table, and shows a block ID 90 along with the first IP address 92 and the last IP address 94 in the block. If the block size is k or greater, then the current block is outputted at step 750 and processing continues at step

705. If the block size is less than k, the current block is not outputted, and processing continues at step 705. Thus, if the example conditions hold, then the block is determined to be an acceptable candidate IP address block at step 740, and is outputted at step 750.

The parameters k and g have potential impact on both the coverage and the returned IP block sizes. Intuitively, a small k is likely to have a large coverage by returning even small dynamic IP ranges, while a large k is more restrictive in considering only large, actively used address blocks. A small g tends to break a large address range into small pieces, while a large g is more likely to return large blocks but may potentially result in more false positives (i.e., static IP addresses mistakenly identified as dynamic ones). In an implementation, both parameters may be set to 8, which may be a minimum for assigning IP address ranges. It should be noted that by using IP address blocks, IP addresses that are not present in the input data may be included in the output.

For each IP address in every candidate multi-user IP address block, a score is then determined in an implementation, at step 30, by the computing device 200. The score is an entropy score, also referred to as usage entropy, and is used to determine the level of dynamic usage. As the entropy score increases, the IP address is more likely to be dynamic. By analyzing the usage entropy, a distinction may be made between a dynamic IP address that had been assigned to multiple hosts (thus multiple users) and a static IP address linked to a single host but shared by multiple users.

Users of dynamic IP addresses can be expected to log in using other IP addresses in the same block. Hence, over a period of time, a dynamic IP address will not only be used by multiple users, but these users also hop around by using other IP addresses in the same block. From a practical viewpoint, dynamic IP addresses are often assigned through random selection from a pool of IP addresses, and when users hop around, the probability of the users using an IP address in the pool can be expected to be roughly uniform.

Figure 7:
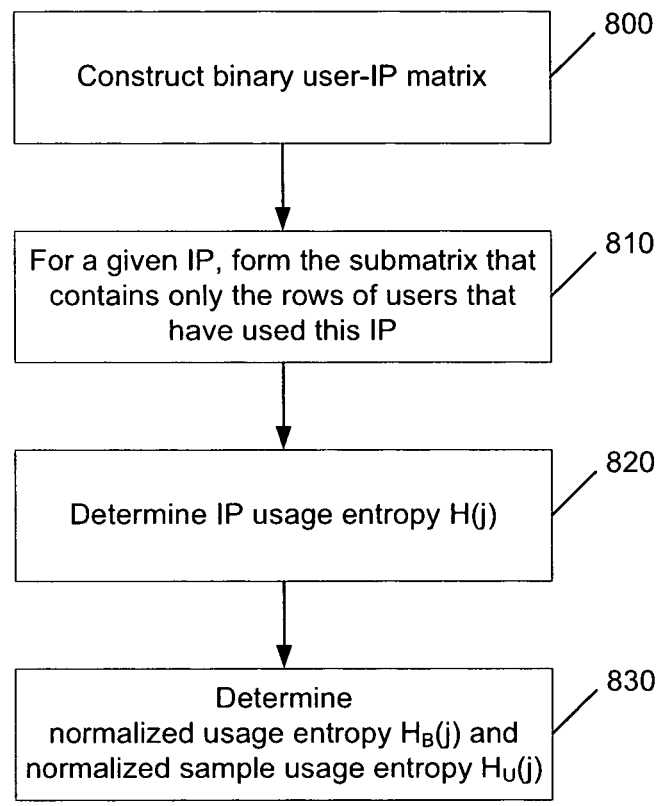
FIG. 7 is a flow diagram of an example method of entropy score determination.

In an implementation, an IP address usage entropy computation is performed on a block-by-block basis, as described further with respect to FIG. 7. Let U denote the set of all users and |U| denote the total number of users in the trace. For every multi-user IP address block $B(IP_1, IP_m)$ with m IP addresses, a binary user-IP matrix $A \in \{0,1\}^{|U| \times m}$ may be constructed at step 800, with A(i, j) set to 1 if and only if user i has logged into the email server from IP address $IP_j$.

Given this example binary user-IP matrix, it is desirable to know, given the set of all users U(j) who used a particular IP address $IP_j$, the probability that these users are using other IP addresses in the block $B(IP_1, IP_m)$. To quantify the skewness of the probability distribution, a metric is used, called IP usage entropy H(j). At step 810, in an implementation, a submatrix $A_j^{|U| \times m}$ of matrix A may be formed that contains only the rows corresponding to users in U(j). In other words, for a given IP, the submatrix is formed that contains only the rows of users that have used this IP. IP usage entropy H(j) may then be computed, at step 820, as:

$$H(j) = -(\Sigma(a_k/z_j)\log_2(a_k/z_j)) \quad (1)$$

for k=1 to m, where $a_k$ is the k-th column sum of submatrix $A_j$, and $z_j$ is the sum of all the entries in submatrix $A_j$.

Because the block size m may vary across different multi-user IP address blocks, two normalized versions of the usage entropy, normalized usage entropy $H_B(j)$ and normalized sample usage entropy $H_U(j)$, may be defined as follows, and determined at step 830:

$$H_B(j) = H(j)/\log_2 m \quad (2)$$

$$H_U(j) = H(j)/\log_2(|C(j)|) \quad (3)$$

Here, $H_B(j)$ quantifies whether the probability of users U(j) (the set of users that used $IP_j$) using other IP addresses in the block is uniformly distributed, while $H_U(j)$ quantifies the probability skewness only across the set of IP addresses, denoted as C(j), that were actually used by U(j).

In a preferred case, where IP addresses are selected randomly from the entire block, the normalized usage entropy $H_B(j)$ of most of the IP addresses in the block is expected to be close to one over time. However, in practice, traces are only of limited duration. Hence the actual observed set of IP addresses used by U(j), during a trace collection period, may only be a fraction of all the IP addresses in the block, especially when the block size is large.

Due to a large block size (e.g., m=2432), usage entropies tend to be relatively small, and may reduce to a function of the total number of addresses (|C(j)|) used by U(j). With limited data, the normalized sample usage entropy $H_U(j)$ is an approximation to the ideal $H_B(j)$ as it better estimates the degree of uniformity in address selection among the set of users U(j). With enough observation from longer term data, C(j)→m for dynamic IP blocks, and hence $H_U(j) \to H_B(j)$.

Figure 8:
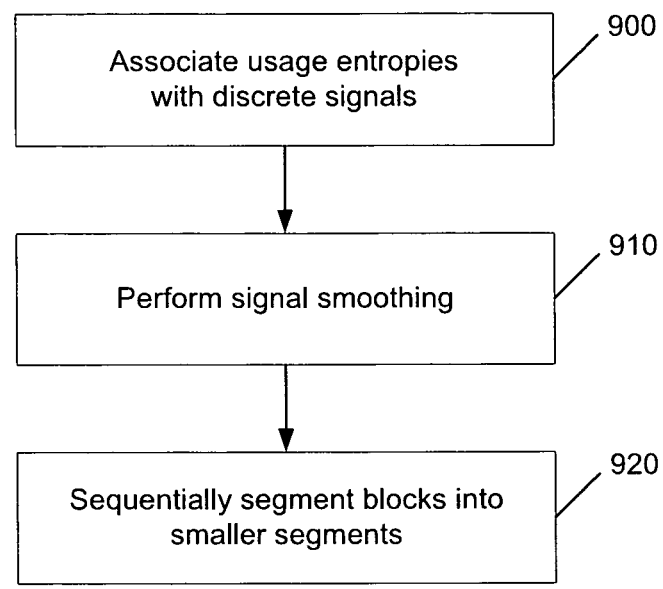
FIG. 8 is a flow diagram of an example method of identifying IP address blocks based on entropy score.

After the IP usage entropies are determined, one might conclude that those IP addresses with usage entropies close to one are dynamic IP addresses. However, the dynamic IP addresses manifest as blocks. Therefore, for each multi-user IP address block, it is desirable to identify sub-blocks of IP addresses within each multi-user IP block, such that the usage entropies of a majority of the IP addresses in a sub-block are above a predetermined threshold $H_e$. More particularly, as further described, at step 40, dynamic IP address blocks are identified by the computing device 200 using signal smoothing techniques, in an implementation, by grouping addresses with high usage entropies, described further with respect to FIG. 8.

Figure 9:
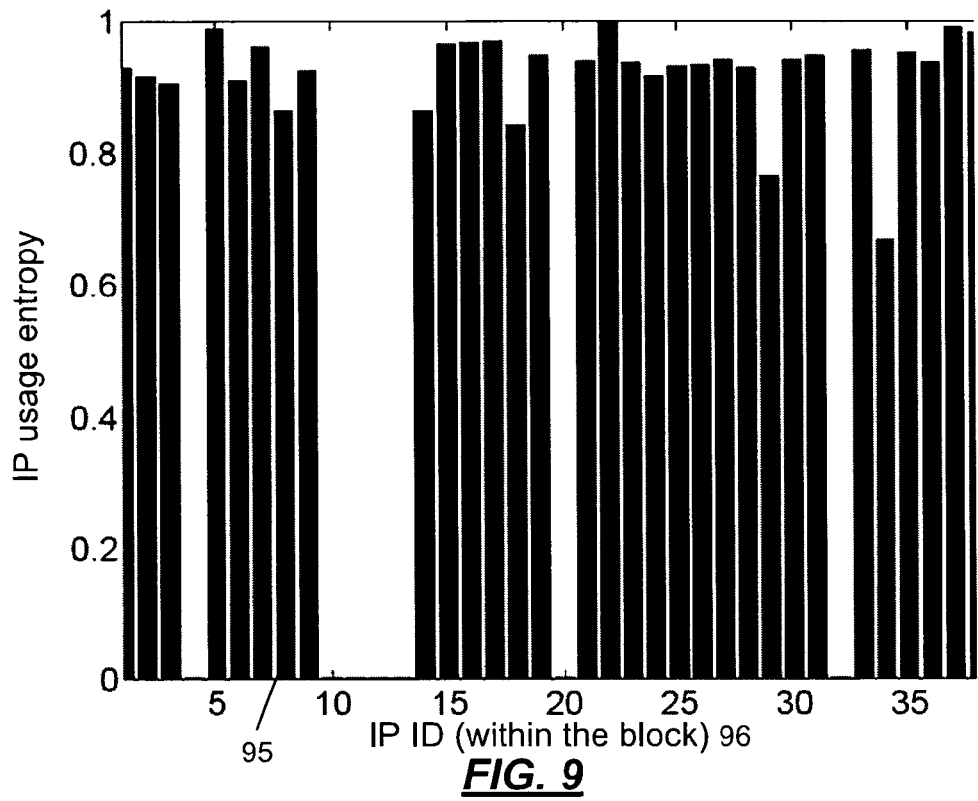
FIG. 9 is a diagram of example signal pulses representing example normalized sample usage entropies of IP addresses.

To achieve the fine-grained segmentation, usage entropy may be regarded as a discrete signal s(i) in the address space, where s(i) can be either $H_B(i)$ or $H_U(i)$. Usage entropies are associated with discrete signals at step 900. FIG. 9 illustrates this representation by plotting the normalized sample usage entropies as signal pulses 95. Note the time index of the discrete signal is the same as that of the IP address space 96.

In an implementation, signal smoothing techniques may then be used, at step 910, to filter out noises appearing as small dips along the signal. The noise may exist because the corresponding IP addresses were either not used by any user or have small usage entropies due to insufficient usage. Median filter, a well known method for suppressing isolated out-of-range noise, may be used, although it is contemplated that any signal smoothing technique may be used. An example median filter method replaces every signal value with the median of its neighbors. Specifically, for each variable $IP_i$, the smoothed signal value s'(i) is computed as:

$$s'(i) = \text{median}\{s(i-w/2), \ldots, s(i+w/2)\} \quad (4)$$

where w is a parameter of the median filter that determines the neighborhood size.

Because the signal smoothing adjusts the signal dips due to insufficient usage of a few individual IP addresses, median filter is applied to only those IP addresses with entropies lower than the predetermined threshold $H_e$, in an implementation. Additionally, median filtering is not applied if a signal value does not have a high enough number of neighbors, for boundary condition reasons. $H_e$ may be set to 0.5 and w may be set to 5. The normalized sample usage entropies are well separated in most cases, and so are not very sensitive to thresholding. Here, w is set to 5, so that the signal smoothing process can smooth over up to two consecutive dips.

Figure 10:
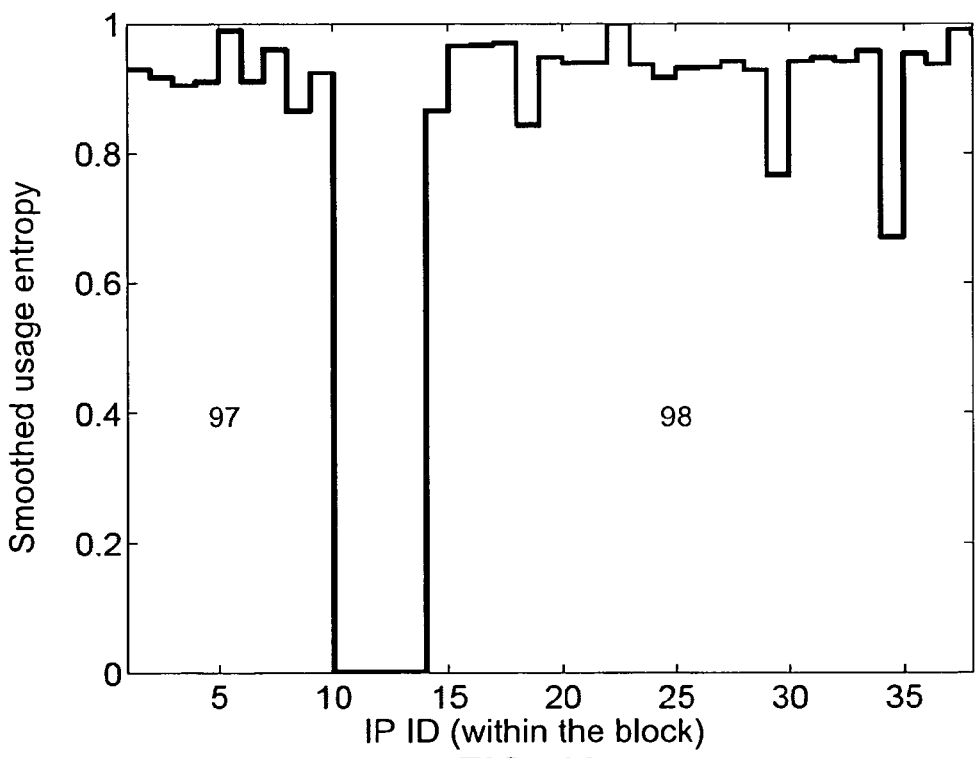
FIG. 10 is a diagram of the example signal pulses of FIG. 9 after being smoothed.

The multi-user blocks may then be sequentially segmented into smaller segments by discarding the remaining dips after signal smoothing, at step 920. Thus, an area under the curve is segmented, with each segment corresponding to a dynamic IP address block. As shown in FIG. 10, the signal smoothing process paves over the sporadic dips in the original signal, but preserves large valleys. Thus, for the example shown in FIG. 10, based on the smoothed signal, two dynamic IP address blocks 97 and 98 will be returned.

At step 50, IP dynamics analysis and large-scale proxy cluster removal may be performed, by the computing device 200 in an implementation. The analysis and removal is directed to the frequency at which a host identity changes with respect to an IP address (i.e., the rate at which an IP address is assigned to different hosts).

Precisely computing IP address dynamics is a fundamentally challenging task because, for example, this information is very fine grained. Even for IP addresses under the same administrative domain and sharing the same routing prefix, IP address dynamics can be very different. For example, static IP addresses for web servers and email servers may be adjacent to a wireless DHCP IP range. Another reason is because many internet service providers (ISPs) and system administrators often consider IP address dynamics to be confidential and proprietary, since such information can potentially be used to infer the size of customer population and operation status. Additionally, the Internet is composed of a large number of independent domains, each having their own policies for IP address assignments.

In an implementation, a metric to quantify IP address dynamics is IP volatility, which expresses the rate at which a given IP address is assigned to different hosts. In an implementation, two metrics may be considered to represent IP volatility for every identified dynamic IP address: (1) the number of distinct service users that have used this address in input data, and (2) the average service inter-user duration, i.e., the time interval between two different users, consecutive in time, using the same IP address. The median inter-user duration may be used as opposed to the mean inter-user duration to eliminate outliers.

Thus, in an implementation, these metrics may be used to quantify IP address volatility for each identified dynamic IP address. As noted above, the input data contains timing information pertaining to the time a user connected to a trace server on a per user-IP pair basis. A trace may contain the first and last timestamps that a user connected to the service. These two fields may be used to estimate the inter-user duration.

IP address dynamics analysis in terms of IP volatility estimation may also be used to remove a class of potential false positive IP addresses. Without IP address dynamics analysis, two classes of false positives may be generated. The first class comprises groups of proxies that employ load balancing to designate users to different servers. The second case includes Internet cafes, teaching clusters, and library machines, where a user physically logs in to any one of a group of equivalent machines. Both cases correspond to a cluster of machines that are configured with a range of continuous static IP addresses, where a user may use any one of the machines. A difference between these two cases is that, for the first case, multiple users can concurrently access a mail service through a single proxy, while in the second case, requests from different users appear sequentially as users cannot simultaneously log on to the same machine. The activity patterns of these two types of static server-clusters are very similar to dynamic IP blocks: they both manifest as blocks, with multiple users being associated with different IP addresses. Therefore, without additional attention, they could potentially be misclassified as dynamic IP addresses. Note that network address translation (NAT) boxes with single static IP addresses do not manifest as blocks and therefore will not be misclassified. There could be enough NAT boxes near each other so as to be a block, but what differentiates these is the mobility of users between the set of IP addresses.

Using IP volatility estimation, the first class of false positives referred to above may be filtered by removing IP addresses with a large number of concurrent accesses. More specifically, consecutive IP addresses may be discarded that are each associated with a large number of users (e.g., at least about 1000 users) and also exhibit very short inter-user duration (e.g., less than about 5 minutes). The parameters may be determined by examining the user population of known proxy IPs (identified through rDNS lookup with the keyword proxy, in an implementation): they correspond to a 5% false negative rate of known proxies.

Moreover, although certain teaching clusters (e.g., labs in universities) and library machines might be misclassified as dynamic IP addresses, these machines are typically in the .edu domain, and they form a relatively small population. In order to classify these machines more accurately, additional information may be used, such as operating system ID and device fingerprinting. The length of the input trace may also impact the quality of results, and longer traces may lead to better coverage.

It should be noted that the above "false positive" scenarios may be included in the results of the computation in an implementation, as the activity indicated may still be relevant to the application's needs. Similarly, they or subsets thereof may be useful as independent outputs.

At step 60, a list of IP address blocks identified as dynamic IP address blocks may be outputted, by the computing device 200 in an implementation. The output may contain the IP address blocks that were identified as being dynamic, and for each returned address, its volatility information, in terms of the rate at which it is assigned to different hosts.

The information outputted from step 60 may be used in subsequent spam detection and filtering, phishing site detection, web crawling, blacklisting, and other security techniques, at step 70, as further described herein. In an implementation, a host may block the dynamic IP addresses as it is widely observed that dynamic IP addresses are used by zombie spammers to send out purely spam emails.

Spam has been an increasing problem on the Internet. Network-based spam filtering approaches, not relying on message content, have started to receive increased attention. Blacklists have been used to publish the IP addresses of spamming email servers captured through email server logs, for example. Spammers often harvest a large number of zombie or botnet hosts to send spam, both to increase their throughput and to defeat the commonly used blacklist-based approaches. Some spammers hijack IP prefixes for spamming. As a result, a decreasing fraction of spamming hosts are listed in blacklists.

The network-based approaches are grounded on the assumption that IP addresses are generally static and that the fraction of dynamic IP addresses tends to be negligible. However, the number of dynamic IP addresses is very large. Identifying active dynamic IP addresses and understanding their properties is desirable for network-based spam filtering approaches. In other words, determining whether an email server is mapped to a dynamic IP address may be a desirable feature to add to spam filtering systems, as well as to systems that identify phishing sites and detect botnet membership.

The example systems and methods described herein provide fine-grained, up-to-date IP address dynamics information. Dynamic IP addresses are identified in terms of IP address blocks, often smaller than IP prefixes, and thus provide more precise information. Because the methods may be fully automated, they can be constantly applied to recent logs to obtain up-to-date information. As described herein, such fine-grained dynamics information can suggest possible host properties behind the IP address, e.g., whether the host is an end user computer, a proxy, or belongs to a kiosk-like shared computer.

The example techniques can be applied to any dataset that contains IP addresses (e.g., user logs, web server logs, search engine logs) and some form of persistent data that can aid tracking of host identities (e.g., user IDs, cookies).

The example systems and methods described herein do not require cooperation across domains. Each domain or server can independently process the collected data, with no need to share information across domains and with no required changes at the client side.

Exemplary Computing Arrangement

Figure 11:
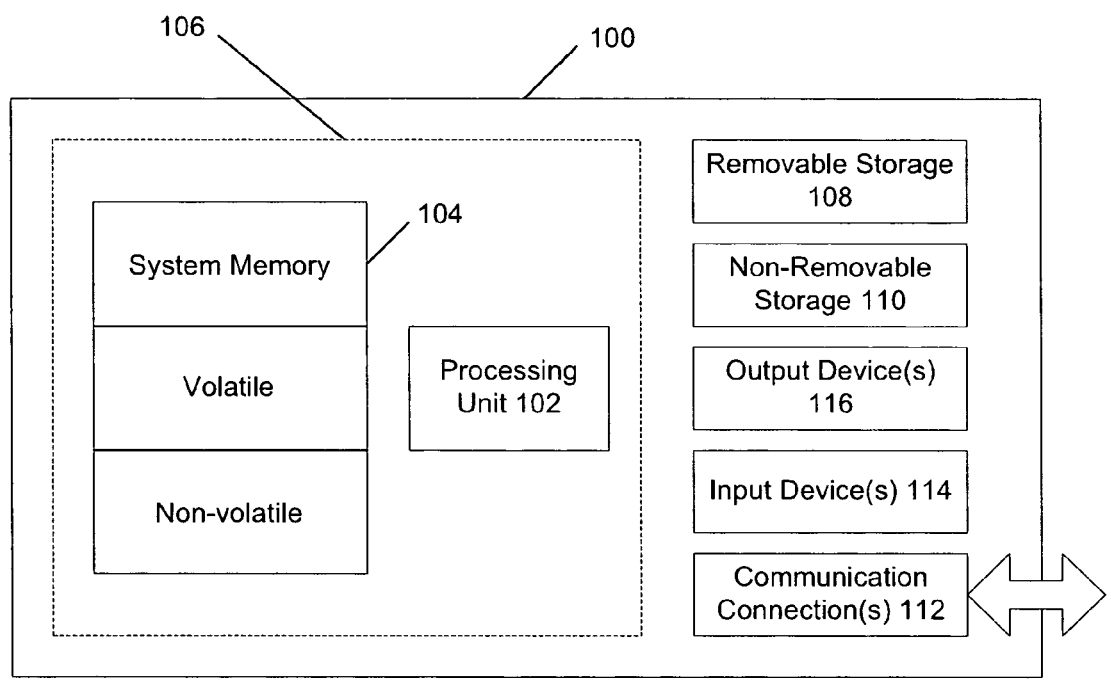
FIG. 11 is a block diagram of an example computing environment in which example embodiments and aspects may be implemented.

FIG. 11 shows an exemplary computing environment in which example embodiments and aspects may be implemented. The computing system environment is only one example of a suitable computing environment and is not intended to suggest any limitation as to the scope of use or functionality. Neither should the computing environment be interpreted as having any dependency or requirement relating to any one or combination of components illustrated in the exemplary operating environment.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.), or some combination of the two. This most basic configuration is illustrated in FIG. 11 by dashed line 106.

Device 100 may have additional features/functionality. For example, device 100 may include additional storage (removable and/or non-removable) including, but not limited to, magnetic or optical disks or tape. Such additional storage is illustrated in FIG. 11 by removable storage 108 and non-removable storage 110.

Device 100 typically includes a variety of computer readable media. Computer readable media can be any available media that can be accessed by device 100 and includes both volatile and non-volatile media, removable and non-removable media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of identifying, among a set of candidate IP addresses, which IP addresses are dynamic Internet protocol (IP) addresses, the method performed by a computing device, the method comprising:

generating, by a processor of the computing device, a candidate IP address block comprised of IP addresses;

computing, by the processor, usage metrics for respective IP addresses in the candidate IP address block, the computing based on usage information from which it can be determined whether any two different IP addresses in the candidate IP address block were used by a same user and whether any IP address in the IP address block was used by two different users; and making, by the processor, a decision that the IP address block from the candidate IP address block consists of dynamic IP addresses that are of a type that are temporarily assigned to devices, wherein the decision is made based on the usage metrics, and storing an indication of the determining with respect to the IP address block in a storage of the computing device.

2. The method of claim 1, wherein determining the candidate IP address block comprises identifying, from the usage information, IP addresses that are multi-user IP addresses.

3. The method of claim 2, wherein generating the candidate IP address block comprises either:
- identifying a consecutive IP address block comprised of IP addresses that belong to the same autonomous system having the same routing prefix entry;
- comparing a block size of the IP address block with a predetermined minimum size; or
- comparing a number of gaps in the IP address block with a predetermined maximum number of gaps.

4. The method of claim 1, wherein the usage information comprises a dataset comprising a plurality of IP addresses representing at least one of a host activity or a user activity, wherein determining the candidate IP address block comprises analyzing the dataset to identify IP addresses that have been used by multiple users.

5. The method of claim 4, wherein the dataset comprises a user login trace associating IP addresses with users that logged into the IP addresses.

6. The method of claim 1, wherein computing the usage metrics comprises:
- constructing a binary user-IP address matrix for the candidate IP address block, an element of the matrix indicating a usage of a corresponding IP address and a user;
- determining a submatrix of the binary user-IP address matrix that comprises a plurality of rows of the matrix that correspond to a plurality of users that have used a given IP address; and
- computing a usage metric for each IP address based on the submatrix.

7. The method of claim 1, further comprising representing the usage metrics of IP addresses as discrete signal curves across the IP address space.

8. The method of claim 1, further comprising performing dynamics analysis on the IP address block.

9. The method of claim 8, wherein performing dynamics analysis comprises:
- identifying IP address blocks that are misclassified as dynamic IP address blocks;
- removing the misclassified IP address blocks from the dynamic IP address blocks; and
- outputting a list comprising the dynamic IP address blocks, and volatility information for each dynamic IP address.

10. The method of claim 9, further comprising using IP volatility information to filter a plurality of IP addresses, and outputting a list of the filtered IP addresses as proxy clusters.

11. The method of claim 1, further comprising using the identified dynamic IP address block and proxy clusters in email filtering, phishing site detection, or web crawling.

12. A method of making a decision that Internet protocol (IP) addresses are dynamic, the method performed by one or more computing devices and comprising:
- receiving and storing a dataset comprising a plurality of IP addresses;
- processing the dataset to identify an IP address range comprising IP addresses obtained from the dataset, and using the dataset to make a decision that the IP address range consists of dynamically used IP addresses, wherein a dynamic IP address is a type of address that is temporarily, not permanently, assigned to different devices; and
- outputting from one or more of the computing devices information indicating that the decision was made with respect to the IP address range.

13. The method of claim 12, wherein the IP address range consists of IP addresses contained within a network boundary and includes IP addresses in the dataset and also implicitly includes unobserved IP addresses not included in the dataset.

14. The method of claim 12, further comprising, in response to determining that the IP address range is comprised of dynamically used IP addresses, blocking emails based on the emails having been sent by the dynamically used IP addresses.

15. The method of claim 12, wherein processing the dataset comprises:
- determining multi-user candidate IP address blocks comprising at least a portion of the plurality of IP addresses, a multi-user candidate IP address block being determined by using two multi-user IP addresses as upper and lower bounds defining the IP address block; and
- determining a usage entropy for IP addresses in each multi-user candidate IP address block, a usage entropy comprising an estimation of uniformity of usage of IP addresses in a multi-user candidate block.

16. A dynamic Internet protocol (IP) address identification system for identifying blocks of IP addresses as being comprised of dynamically assigned IP addresses, comprising:
- a processor that determines candidate IP address blocks from an input dataset comprised of IP addresses; and
- the processor accessing a stored dataset comprised of indicia of a plurality of users and indicia of a plurality of IP addresses and comprised of usage information that represents which of the users used which of the IP addresses, where the use of an IP address comprises the use of a computer assigned that IP address, and where the dataset indicates that some of the IP addresses were used by multiple of the users and some of the users used multiple of the IP addresses;
- the processor computing, from the stored dataset, usage metrics for respective IP addresses in each candidate IP address block, where, for a set of users that used the IP addresses in a given candidate IP address block, and given a usage distribution comprising information from the dataset indicating which users, in the set of users, used which IP addresses in the given candidate IP address block, the usage metric corresponding to the given usage distribution comprises a measure of uniformity of distribution of users over the given usage distribution.

17. The system of claim 16, wherein the processor determines that at least one IP address block from the at least one candidate IP address block is comprised of dynamic IP addresses, wherein the determining is based on usage metrics corresponding to that IP address block.

18. The system of claim 17, wherein the CPU performs dynamics analysis on the identified dynamic IP address blocks.

19. The system of claim 17, further comprising an output device that provides the at least one identified dynamic IP address block to at least one host for filtering communications based on IP addresses.

20. The system of claim 16, wherein the input dataset further comprises indicia of user logins on the IP addresses in the dataset.

* * * * *